(12) United States Patent
Tucker

(10) Patent No.: US 11,525,581 B2
(45) Date of Patent: Dec. 13, 2022

(54) PERSONAL POWER USING METAL-SUPPORTED SOLID OXIDE FUEL CELLS OPERATED IN A CAMPING STOVE FLAME

(71) Applicant: Michael C Tucker, Piedmont, CA (US)

(72) Inventor: Michael C Tucker, Piedmont, CA (US)

(73) Assignee: U. S. Department of Energy, Washington, DC (US)

(*) Notice: Subject to any disclaimer, the term of this patent is extended or adjusted under 35 U.S.C. 154(b) by 327 days.

(21) Appl. No.: 16/744,128

(22) Filed: Jan. 15, 2020

(65) Prior Publication Data

US 2020/0224881 A1     Jul. 16, 2020

Related U.S. Application Data

(60) Provisional application No. 62/793,169, filed on Jan. 16, 2019.

(51) Int. Cl.
| | |
|---|---|
| *H01M 8/04* | (2016.01) |
| *H01M 8/12* | (2016.01) |
| *F24C 3/14* | (2021.01) |
| *F21V 33/00* | (2006.01) |
| *F24C 3/04* | (2021.01) |
| *H01M 8/04858* | (2016.01) |
| *F21Y 115/10* | (2016.01) |

(52) U.S. Cl.
CPC .............. *F24C 3/14* (2013.01); *F21V 33/008* (2013.01); *F24C 3/042* (2013.01); *H01M 8/04932* (2013.01); *H01M 8/12* (2013.01); *F21Y 2115/10* (2016.08); *H01M 2008/1293* (2013.01)

(58) Field of Classification Search
CPC ...... H01M 8/04; H01M 8/04858; H01M 8/12; H01M 8/10; F24C 3/14; F24C 3/04; F21V 33/00
See application file for complete search history.

(56) References Cited

U.S. PATENT DOCUMENTS

| | | | |
|---|---|---|---|
| 6,352,792 B1 * | 3/2002 | Parchamazad | B01J 8/0221 |
| | | | 429/425 |
| 2012/0073570 A1 * | 3/2012 | Wall | A47J 36/26 |
| | | | 126/9 R |
| 2013/0115483 A1 * | 5/2013 | Tucker | H01M 8/1233 |
| | | | 429/468 |
| 2017/0042374 A1 * | 2/2017 | Young | F24V 30/00 |
| 2017/0365873 A1 * | 12/2017 | Vulliet | H01M 8/0258 |
| 2018/0249863 A1 * | 9/2018 | Moksin | F24C 7/10 |

* cited by examiner

*Primary Examiner* — Kenneth J Douyette
(74) *Attorney, Agent, or Firm* — Timothy L. Harney; Daniel Park; Brian J. Lally

(57) ABSTRACT

One or more embodiments relates to a portable, personal device for providing cooking and power and adapted for use with a burner, the device including a plurality of metal-supported solid oxide fuel cells (MS-SOFCs) coupled together; a microelectronic control circuit connected to at least the MS-SOFCs; a light source coupled to at least the microelectronic control circuit; and at least one USB port coupled to at least the microelectronic control circuit; whereby the device is able to simultaneously provide light and power a personal device.

20 Claims, 14 Drawing Sheets

PERSONAL POWER USING METAL-SUPPORTED SOLID OXIDE FUEL CELLS OPERATED IN A CAMPING STOVE FLAME

CROSS-REFERENCE TO RELATED APPLICATIONS

This application claims the benefit of and priority to the U.S. Provisional Application Ser. No. 62/793,169 filed Jan. 16, 2019, the complete subject matter of which is incorporated herein by reference in its entirety.

STATEMENT OF GOVERNMENT SUPPORT

The United States Government has rights in this invention pursuant to Contract No. DE-AC02-05CH11231 and Grant No. LBNL-17-TCF-16-12141 between Lawrence Berkley National Laboratory and the U.S. Department of Energy.

FIELD OF THE INVENTION

Embodiments relate to the use of powering personal mobile devices. More specifically embodiments relate to metal-supported solid oxide fuel cells operated in a camping stove flame to power mobile devices.

BACKGROUND

Solid oxide fuel cells (SOFCs) operate at elevated temperatures, typically 600-900° C., and require an selectrochemically-active fuel such as $H_2$ or CO to produce power. An extremely simple way to fulfill these requirements is to place the anode of the SOFC in contact with a flame, which provides the necessary heat and contains $H_2$ and CO within the primary combustion zone. This "direct-flame" setup yields relatively low performance and very low fuel-to-power efficiency but has been studied extensively in the literature due to the simplicity and appeal of the system; no costly balance of plant is required to produce power. Direct-flame SOFCs have been operated with a variety of gaseous, liquid, and solid fuels, including methane, propane, butane, ethylene, ethanol, methanol, paraffin, and wood.

A wide variety of burner configurations have been implemented, including jet burner tubes which provide a simple setup and stable flames, micro-jet flames, multi-element diffusion flame burners, and flat flame burners which provides very uniform temperature and concentration distributions across the cell area. Applications including an integrated multi-cell microtubular stack, and a tri-generation system for power, heating, and cooling has been analyzed, and deployment may be envisioned anywhere flames are available, including industrial heating, residential water heating, and well-head gas flares. Low electrical efficiency is expected in such scenarios, as much of the fuel is combusted to produce heat, but the direct flame configuration may provide electricity where none is otherwise available.

Metal-supported SOFCs (MS-SOFCs) are particularly well suited to direct-flame operation due to their tolerance to thermal cycling and anode re-oxidation, providing additional benefits including low materials cost, mechanical ruggedness, and in some cases high power density. The MS-SOFC architecture illustrated in s 1A-D is symmetric, including porous stainless-steel supports and porous YSZ electrode layers bonded to both sides of the YSZ electrolyte. Nano-scale catalysts are introduced into both electrodes by infiltration. Performance of MS-SOFCs in propane direct-flame configuration was systematically mapped over a wide range of flame operation parameters, including burner-to-cell gap height, equivalence ratio, and flow velocity, using a tubular burner as shown in FIG. 1D. High power, 633 mW $cm^{-2}$ at 833° C., was achieved under controlled and optimized conditions.

A need exists in the art for fabricating a stack of larger MS-SOFCs that provides an order of magnitude higher power; using low-cost materials to join the cells; designing the stack to be coupled with high-efficiency power electronics for LED lighting and mobile phone charging; and, overcoming challenges associated with producing power while simultaneously cooking.

SUMMARY

One object of at least one embodiment is to fabricate a stack of larger MS-SOFCs that provides an order of magnitude higher power; using low-cost materials to join and electrically connect the cells; designing the stack to be coupled with high-efficiency power electronics for LED lighting and mobile phone charging; and, overcoming challenges associated with producing power while simultaneously cooking.

One or more embodiments relate to a portable, personal device for providing cooking and power and adapted for use with a burner. The device includes a plurality of metal-supported solid oxide fuel cells (MS-SOFCs) coupled together; a microelectronic control circuit connected to at least the MS-SOFCs; a light source coupled to at least the microelectronic control circuit; and at least one USB port coupled to at least the microelectronic control circuit; whereby the device is able to provide light and power a personal device.

Still another embodiment relates to a system for providing cooking and power, the system including a burner; a stack of metal-supported solid oxide fuel cells (MS-SOFCs) coupled together and oriented with respect to the burner; a microelectronic control circuit connected to at least the MS-SOFCs; at least one LED lighting element coupled to at least the microelectronic control circuit; and at least one USB port, whereby the MS-SOFCs provides a total power of at least 2 W and further whereby the device is able to provide light, power a personal device charging and cooking.

In one or more embodiments, the MS-SOFCs are oriented vertically or horizontally with respect to the burner. It is contemplated that some of the MS-SOFCs may be oriented perpendicular and some may be oriented horizontal with respect to the burners.

In one or more embodiments, the plurality of MS-SOFCs comprise a stack of five MS-SOFCs, connected in series, where each one of the five stacked MS-SOFCs delivers 0.3V-0.6V (0.5 V for example). In one or more embodiments, the light source may comprise an LED and an LED driver in communication with the MS-SOFCs and the LED. Further, the microelectronic circuit may comprise a boost converter in communication with at least the MS-SOFCs and the USB port. One or more devices are contemplated where insulation is used with at least one surface of one or more MS-SOFCs.

Still other embodiments relate to a complete stand-alone product providing combined cooking including a camping stove with a stack of metal-supported solid oxide fuel cells (MS-SOFCs) delivering power to microelectronic LED driver and voltage boost circuits. The five-cell stack produces at least 2.0 W (2.7 W or 156 $mWcm^{-2}$ for example)s while cooking on the stove and is demonstrated to produce LED lighting and mobile phone charging while operating outdoors. Cooking efficiency is minimally impacted by the presence of the MS-SOFCs. It is found that vertical orientation of the cells is critical to maintain separation of fuel and air when a pot is placed on the stove.

The following articles are incorporated herein by reference in their entirety:

[1] Aguilar-Arias J, Hotza D, Lenormand P, Ansart F. Planar solid oxide fuel cells using PSZ, processed by sequential aqueous tape casting and constrained sintering. J Am Ceram Soc 2013; 96:3075-83. doi:10.1111/jace.12559.

[2] Hirasawa T, Kato S. A Study on Energy Conversion Efficiency of Direct Flame Fuel Cell Supported by Clustered Diffusion Microflames. J Phys Conf Ser 2014; 557:12120. doi:10.1088/1742-6596/557/1/012120.

[3] Horiuchi M, Katagiri F, Yoshiike J, Suganuma S, Tokutake Y, Kronemayer H, et al. Performance of a solid oxide fuel cell couple operated via in situ catalytic partial oxidation of n-butane. J Power Sources 2009; 189:950-7. doi:10.1016/j.jpowsour.2008.12.100.

[4] Horiuchi M, Suganuma S, Watanabe M. Electrochemical Power Generation Directly from Combustion Flame of Gases, Liquids, and Solids. J Electrochem Soc 2004; 151:A1402. doi:10.1149/1.1778168.

[5] Hossain M M, Myung J, Lan R, Cassidy M, Burns I, Tao S, et al. Study on Direct Flame Solid Oxide Fuel Cell Using Flat Burner and Ethylene Flame. ECS Trans 2015; 68:1989-99. doi:10.1149/06801.1989ecst.

[6] Kronemayer H, Barzan D, Horiuchi M, Suganuma S, Tokutake Y, Schulz C, et al. A direct-flame solid oxide fuel cell (DFFC) operated on methane, propane, and butane. J Power Sources 2007; 166:120-6. doi:10.1016/j.jpowsour.2006.12.074.

[7] Nakamura Y, Endo S. Power generation performance of direct flame fuel cell (DFFC) impinged by small jet flames. J Micromechanics Microengineering 2015; 25:104015. doi:10.1088/0960-1317/25/10/104015.

[8] Sun L, Hao Y, Zhang C, Ran R, Shao Z. Coking-free direct-methanol-flame fuel cell with traditional nickel-cermet anode. Int J Hydrogen Energy 2010; 35:7971-81. doi:10.1016/j.ijhydene.2010.05.048.

[9] Tian Y, Lü Z, Wei B, Wang Z, Liu M, Li W, et al. A non-sealed solid oxide fuel cell micro-stack with two gas channels. Int J Hydrogen Energy 2011; 36:7251-6. doi:10.1016/j.ijhydene.2011.03.057.

[10] Vogler M, Barzan D, Kronemayer H, Schulz C, Horiuchi M, Suganuma S, et al. Direct-Flame Solid-Oxide Fuel Cell (DFFC): A Thermally Self-Sustained, Air Self-Breathing, Hydrocarbon-Operated SOFC System in a Simple, No-Chamber Setup. ECS Trans 2007; 7:555-64. doi:10.1149/1.2729136.

[11] Wang Y, Shi Y, Yu X K, Cai N S, Li S. Direct Flame Fuel Cell Performance Using a Multi-element Diffusion Flame Burner. ECS Trans 2013; 57:279-88. doi:10.1017/CB09781107415324.004.

[12] Wang Y. Performance Characteristics of a Micro-tubular Solid Oxide Fuel Cell Operated with a Fuel-rich Methane Flame. ECS Trans 2015; 68:2237-43. doi:10.1149/06801.2237ecst.

[13] Wang Y, Zeng H, Cao T, Shi Y, Cai N, Ye X, et al. Start-up and operation characteristics of a flame fuel cell unit. Appl Energy 2016; 178:415-21. doi:10.1016/j.apenergy.2016.06.067.

[14] Wang Y, Zeng H, Shi Y, Cao T, Cai N, Ye X, et al. Power and heat co-generation by micro-tubular flame fuel cell on a porous media burner. Energy 2016; 109:117-23. doi:10.1016/j.energy.2016.04.095.

[15] Wang K, Ran R, Hao Y, Shao Z, Jin W, Xu N. A high-performance no-chamber fuel cell operated on ethanol flame. J Power Sources 2008; 177:33-9. doi:10.1016/j.jpowsour.2007.11.004.

[16] Wang Y Q, Shi Y X, Yu X K, Cai N S, Li S Q. Integration of Solid Oxide Fuel Cells with Multi-Element Diffusion Flame Burners. J Electrochem Soc 2013; 160: F1241-4. doi:10.1149/2.051311jes.

[17] Wang Y, Shi Y, Yu X, Cai N, Qian J, Wang S. Experimental Characterization of a Direct Methane Flame Solid Oxide Fuel Cell Power Generation Unit. J Electrochem Soc 2014; 161:F1348-53. doi:10.1149/2.0381414jes.

[18] Wang K, Milcarek R J, Zeng P, Ahn J. Flame-assisted fuel cells running methane. Int J Hydrogen Energy 2014; 40:4659-65. doi:10.1016/j.ijhydene.2015.01.128.

[19] Wang K, Zeng P, Ahn J. High performance direct flame fuel cell using a propane flame. Proc Combust Inst 2011; 33:3431-7. doi:10.1016/j.proci.2010.07.047.

[20] Wang Y, Sun L, Luo L, Wu Y, Liu L, Shi J. The study of portable direct-flame solid oxide fuel cell (DF-SOFC) stack with butane fuel. J Fuel Chem Technol 2014; 42:1135-9. doi:10.1016/51872-5813(14)60045-1.

[21] Zhu X, Lü Z, Wei B, Huang X, Wang Z, Su W. Direct Flame SOFCs with La[sub 0.75]Sr[sub 0.25]Cr[sub 0.5] Mn[sub 0.5]O[sub 3-δ]/Ni Coimpregnated Yttria-Stabilized Zirconia Anodes Operated on Liquefied Petroleum Gas Flame. J Electrochem Soc 2010; 157:B1838. doi:10.1149/1.3500976.

[22] Zhu X, Wei B, Lü Z, Yang L, Huang X, Zhang Y, et al. A direct flame solid oxide fuel cell for potential combined heat and power generation. Int J Hydrogen Energy 2012; 37:8621-9. doi:10.1016/j.ijhydene.2012.02.161.

[23] Wang Y, Shi Y, Cao T, Zeng H, Cai N, Ye X, et al. A flame fuel cell stack powered by a porous media combustor. Int J Hydrogen Energy 2017:1-5. doi:10.1016/j.ijhydene.2017.01.088.

[24] Milcarek R J, Garrett M J, Wang K, Ahn J. Micro-tubular flame-assisted fuel cells running methane. Int J Hydrogen Energy 2016; 41:20670-9. doi:10.1016/j.ijhydene.2016.08.155.

[25] Milcarek R J, Garrett M J, Ahn J. Micro-tubular flame-assisted fuel cell stacks. Int J Hydrogen Energy 2016; 41:21489-96. doi:10.1016/j.ijhydene.2016.09.005.

[26] Milcarek R J, Wang K, Falkenstein-Smith R L, Ahn J. Micro-tubular flame-assisted fuel cells for micro-combined heat and power systems. J Power Sources 2016; 306:148-51. doi:10.1016/j.jpowsour.2015.12.018.

[27] Milcarek R J, Ahn J. Rich-burn, flame-assisted fuel cell, quick-mix, lean-burn (RFQL) combustor and power generation. J Power Sources 2018; 381:18-25. doi:10.1016/j.jpowsour.2018.02.006.

[28] Wang Y, Shi Y, Luo Y, Cai N, Wang Y. Dynamic analysis of a micro CHP system based on flame fuel cells. Energy Convers Manag 2018; 163:268-77. doi:10.1016/j.enconman.2018.02.064.

[29] Zeng H, Wang Y, Shi Y, Cai N. Biogas-fueled flame fuel cell for micro-combined heat and power system. Energy Convers Manag 2017; 148:701-7. doi:10.1016/j.enconman.2017.06.039.

[30] Tucker M C. Progress in metal-supported solid oxide fuel cells: A review. J Power Sources 2010; 195:4570-82. doi:10.1016/j.jpowsour.2010.02.035.

[31] Larring Y, Fontaine M-L. Critical Issues of Metal-Supported Fuel Cell. Green Energy Technol 2013; 55. doi:10.1007/978-1-4471-4456-4.

[32] Krishnan V V. Recent developments in metal-supported solid oxide fuel cells. Wiley Interdiscip Rev Energy Environ 2017:e246. doi:10.1002/wene.246.

[33] Tucker M C. Development of High Power Density Metal-Supported Solid Oxide Fuel Cells. Energy Technol 2017; 5:2175-81.

[34] Tucker M C, Ying A S. Metal-Supported Solid Oxide Fuel Cells Operated in Direct-Flame Configuration. Int J Hydrogen Energy 2017; 42:24426-34. doi:10.1016/j.ijhydene.2017.07.224.

[35] HALO Fuel Cell: A Charger For Your Outdoor Needs 2013. https://www.kickstarter.com/projects/pointsource-power/halo-fuel-cell-a-charger-for-your-outdoor-needs?ref=live (accessed Jun. 2, 2018).

[36] Tucker M C, Lau G Y, Jacobson C P, DeJonghe L C, Visco S J. Performance of metal-supported SOFCs with infiltrated electrodes. J Power Sources 2007; 171:477-82. doi:10.1016/j.jpowsour.2007.06.076.

[37] Sholklapper T Z, Radmilovic V, Jacobson C P, Visco S J, De Jonghe L C. Synthesis and Stability of a Nanoparticle-Infiltrated Solid Oxide Fuel Cell Electrode. Electrochem Solid-State Lett 2007; 10:674-6. doi:10.1149/1.2434203.

[38] Vogler M, Horiuchi M, Bessler W G. Modeling, simulation and optimization of a no-chamber solid oxide fuel cell operated with a flat-flame burner. J Power Sources 2010; 195:7067-77. doi:10.1016/j.jpowsour.2010.04.030.

[39] Endo S, Nakamura Y. Power generation properties of Direct Flame Fuel Cell (DFFC). J Phys Conf Ser 2014; 557:12119. doi:10.1088/1742-6596/557/1/012119.

[40] Tucker M, Personal Power Using metal-supported solid oxide fuel cells operated in a camping stove flame. International Journal of Hydrogen Energy (2018) 43: 8991-8998.

BRIEF DESCRIPTION OF THE DRAWINGS

The invention together with the above and other objects and advantages will be best understood from the following detailed description of the preferred embodiment of the invention shown in the accompanying drawings, wherein:

FIG. 1C depicts a cathode pore after infiltration of LSM nanoparticles, with an approximate layer thicknesses are: metal support 250 μm, porous electrode 20 μm, and electrolyte 10 μm; while

FIG. 5B depicts a graph illustrating stack performance at high (red square) and low (blue triangle) camp stove flame settings—large data points indicate the stack operation point when the LED (circles) or phone charging (diamonds) circuits were connected to the MS-SOFC stack; while

FIG. 6B depicts a graph illustrating stack performance with (red squares) and without (blue triangles) a water-filled pot on the stove; while

FIG. 9A depicts an arrangement of 5 MS-SOFC cells over the flame area of a burner while

DETAILED DESCRIPTION

The foregoing summary, as well as the following detailed description of certain embodiments of the present inventions, will be better understood when read in conjunction with the appended drawings.

The following detailed description should be read with reference to the figures in which similar elements in different figures are numbered the same. The figures, which are not necessarily to scale, depict illustrative embodiments and are not intended to limit the scope of the invention.

Figure 1A:
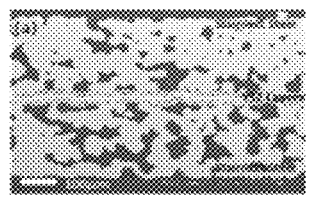
FIG. 1A depicts an SEM image of a polished cross section of MS-SOFC structure after sintering.

One or more embodiments relate to a metal-supported SOFCs (MS-SOFCs) are particularly well suited to direct-flame operation due to their tolerance to thermal cycling and anode re-oxidation, and provide additional benefits including low materials cost, mechanical ruggedness, and in some cases high power density. The MS-SOFC architecture shown in FIG. 1A is symmetric, with porous stainless-steel supports and porous YSZ electrode layers bonded to both sides of the YSZ electrolyte. Nano-scale catalysts are introduced into both electrodes by infiltration. The performance of MS-SOFC in propane direct-flame configuration was systematically mapped over a wide range of flame operation parameters, including burner-to-cell gap height, equivalence ratio, and flow velocity, using a tubular burner as shown in FIG. 1D. High power, 633 mWcm$^{-2}$ at 833° C., was achieved under controlled and optimized conditions.

An interesting application of the direct-flame configuration is portable personal power achieved by inserting SOFCs into the flame of an operating cooking stove. Simple proofof-concept of this design have been fabricated previously. A small camping stove with isopropane-butane fuel was fitted with 10 small MS-SOFCs in series, mounted horizontally above the burner face, and providing power to a USB port with no power conditioning electronics; performance was not reported. A butane camping stove was fitted with 3 small anode-supported cells (ASC) each 0.8 cm$^2$, mounted horizontally above the burner face, and joined in series by silver paste and wires. The stack was heated up in about 10 min, provided 0.24 W (0.1 Wcm$^{-2}$), and was used to power a small fan. Multiple thermal cycles were not reported, but it is expected that such small ASCs would survive if the heating and cooling rates are sufficiently slow. Embodiments herein where improved by fabricating a stack of larger MS-SOFCs that provides an order of magnitude higher power; using low-cost materials to join the cells; designing the stack to be coupled with high-efficiency power electronics for LED lighting and mobile phone charging; and, overcoming challenges associated with producing power while simultaneously cooking.

Figure 1B:
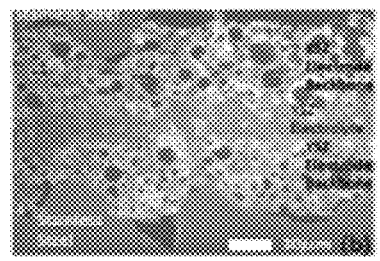
FIG. 1B depicts an SEM image of polished cross section of MS-SOFC structure before catalyst infiltration.
Figure 1C:
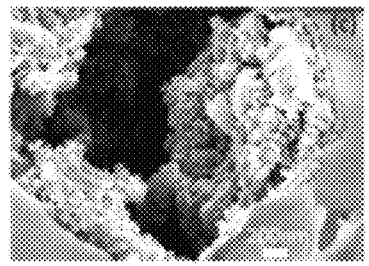
Figure 1D:
FIG. 1D depicts an image of the anode side of the cell with a flame impinging on the 1 cm$^2$ active area in the center of the cell.

FIGS. 1A-1B depict MS-SOFC and flame setup where FIG. 1A depicts an SEM image of polished cross section of MS-SOFC structure after sintering, and FIG. 1B depicts an SEM image of polished cross section of MS-SOFC structure before catalyst infiltration. FIG. 1C depicts cathode pore after infiltration of LSM nanoparticles with an approximate layer thicknesses of metal support 250 μm, porous electrode 20 μm, and electrolyte 10 μm. FIG. 1D depicts a picture of the anode side of the cell with flame impinging on the 1 cm$^2$ active area in the center of the cell.

In one embodiment, MS-SOFCs cells were fabricated from YSZ (8Y, Tosoh) and stainless steel (P434L alloy, water atomized, Ametek Specialty Metal Products) layers prepared by tape-casting. Individual tapes were laminated together to create the green cell structure. Cells were cut from the layered tape with a laser cutter (H-series, Full Spectrum Laser). Cells were debinded in air at 525° C. for 1 h, and then sintered in 2% hydrogen in argon at 1350° C. for 2 hours in a tube furnace. After sintering, cells were infiltrated by techniques described previously with $La_{0.15}Sr_{0.85}MnO_{3-d}$ (LSM) on the cathode side and $Sm_{0.2}Ce_{0.8}O_{2-d}$ (SDC) mixed with Ni with a ceria: Ni volume ratio of 80:20 on the anode side. Each side was infiltrated 3 times to ensure appropriate catalyst loading. Vacuum was applied during each infiltration to assist evacuation of air and flooding of precursor into all pore space in the cell. Each cell was a rectangle with 3.4 cm$^2$ active area.

Complete cells were stacked in series by connecting the anode of one cell to the cathode of the adjacent cell using 430 stainless steel mesh spot-welded directly to the metal supports of the cells. Each stack comprised 5 cells. Wire current leads (430 stainless steel) were welded to the meshes of the first and last cells. Wires or meshes made of other metals that resist corrosion at up to 850° C. are also acceptable for the connections between cells and current leads, including 400-series stainless steels and NiCr alloys. The stack was placed on the burner of a propane-fueled camping stove (Coleman). Stack performance was assessed with a potentiostat (Biologic SP-150 with 5 A current booster).

A commercially available LED, LED driver, and voltage boost converter circuits were characterized using a light meter (held at 120 mm from the LED) (Extech LT40), multimeter (Fluke 115), clamp ammeter (Electronic Specialties ES-687), digital power supply (GW Instek GPR-1810HD), and digital electronic load (BK Precision 8540). LED driver and boost converter circuit efficiencies were calculated by dividing output power by the input power. The boost converter provided nominally 5 V at no load. Output current was assessed by connecting the output of the boost converter to a digital electronic load set at 4.8 V.

Embodiments determined the MS-SOFC performance in propane direct-flame configuration using a controlled flame and cell position, with small active cell area to approximate homogeneous performance over the active area. Power density above 150 mWcm$^{-2}$ was obtained for a wide range of equivalence ratio, fuel flowrate, burner-to-cell gap distance, and cell orientation. Under optimal conditions, cell performance of 633 mWcm$^{-2}$ was achieved (See FIG. 2A). This range of power density sets expectations for, and informs the design of, the present stand-alone device. It was also demonstrated that the MS-SOFC can withstand extremely rapid start-up, in a few seconds and multiple heating/cooling cycles did not affect cell performance (See FIG. 2B). This suggests that controlling heating or cooling rate in the present system is not necessary, and the stove can simply be turned on and off as desired.

Figure 2A:
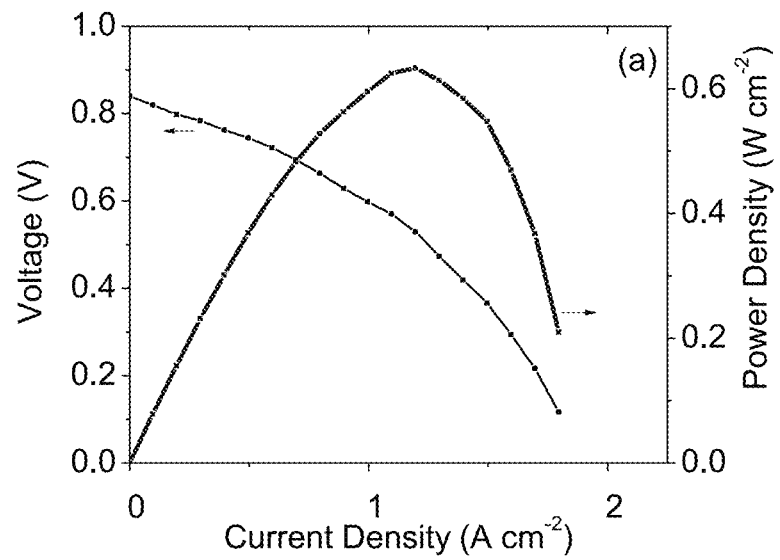
FIG. 2A depicts a graph illustrating direct-flame operation under controlled laboratory conditions with optimal performance for a fresh MS-SOFC at 1.8 equivalence ratio and 300 cm s$^{-1}$ flow velocity at 833° C.
Figure 2B:
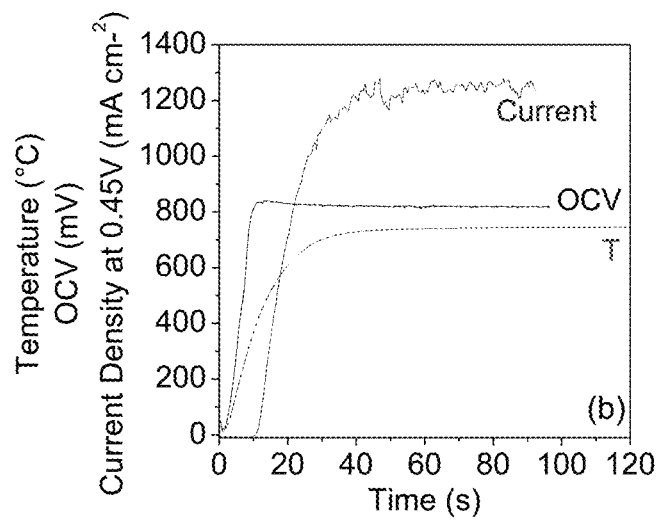
FIG. 2B depicts a graph illustrating direct-flame operation under controlled laboratory conditions with rapid startup: OCV (black), temperature (red), and current density at 0.45 V (blue) recorded upon placing the MS-SOFC into a flame operating at 1.7 equivalence ratio and 250 cm s$^{-1}$ flow velocity.

FIGS. 2A-2B depict graphs illustrating direct-flame operation under controlled laboratory conditions. FIG. 2A depicts a graph illustrating optimal performance for a fresh MS-SOFC at 1.8 equivalence ratio and 300 cm s$^{-1}$ flow velocity at 833° C. FIG. 2B depicts a graph illustrating rapid startup: OCV (black), temperature (red), and current density at 0.45 V (blue) recorded upon placing the MS-SOFC into a flame operating at 1.7 equivalence ratio and 250 cm s$^{-1}$ flow velocity.

Figure 3:
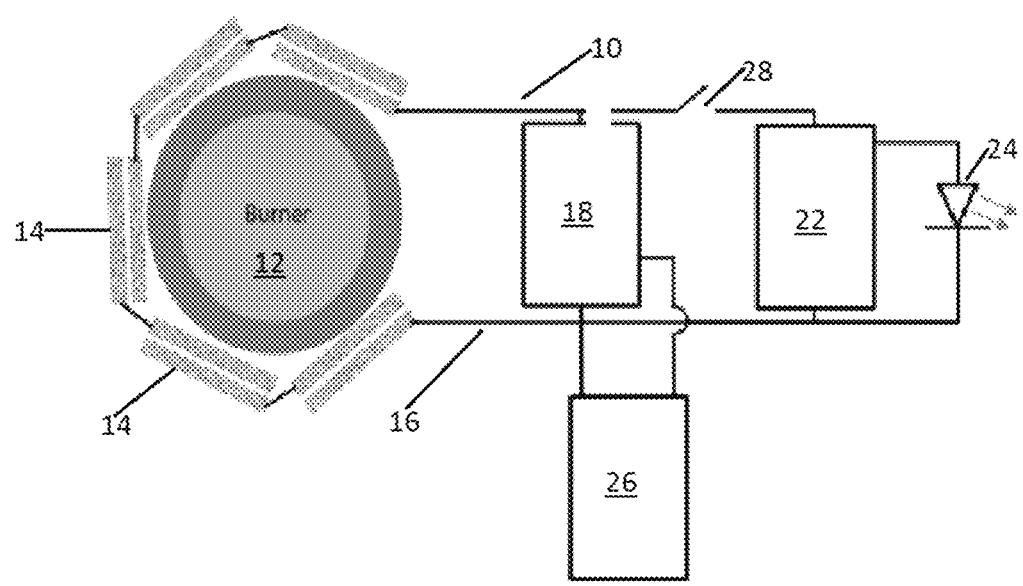
FIG. 3 depicts an electrical schematic of a system, in accordance with one embodiment, where the connector coupling the electronics to the wiring (stainless steel wiring for example) of the MS-SOFC stack are not shown.

One embodiment of a device, generally designated 10, is illustrated in FIG. 3. As illustrated, the system 10 includes one or more (five are illustrated) metal-supported solid oxide fuel cells (MS-SOFCs) 14 adapted to be arranged about one or more burners 12. A microelectronic circuit controller 16 is illustrated connected to at least the MS-SOFCs 14, a light source 24, an LED for example, and a USC connector or port 26. In at least one embodiment, the microelectronic circuit controller 16 includes a switch 28, boost converter 18 connected to at least the USB connector port 26. In at least one embodiment, the microelectronic circuit 16 includes an LED driver 22 coupled to at least the LED 24 and switch 28.

It should be appreciated that the performance of the MS-SOFCs 14 are sensitive to fuel flowrate, air-to-fuel equivalence ratio, temperature, and flame position, all of which may change rapidly due to wind, cookware placement, and heating power set by the user. To prevent flickering of the light source 24 or rapid transients in USB voltage that would interfere with charging the mobile device, it is contemplated that the device 10 include power conditioning electronics to provide a satisfying user experience under real outdoor cooking conditions. For example, the microelectronic circuit controller 16 include the voltage boost component 18 enabling for a stack with fewer cells as provided in FIG. 3. In practice, one or more LEDs 24 are powered by the LED driver circuit or component 22 that takes power and converts it to the correct voltage for the LED 24 thus providing more uniform light and protecting the LED 24 from high voltages. Using a driver circuit 22, a wider range of input voltage are acceptable.

Figure 4A:
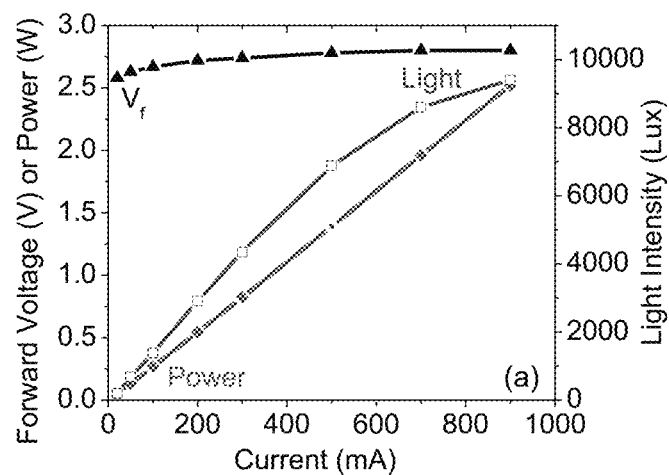
FIG. 4A depicts a graph illustrating operating curves of electronic components including an LED.
Figure 4B:
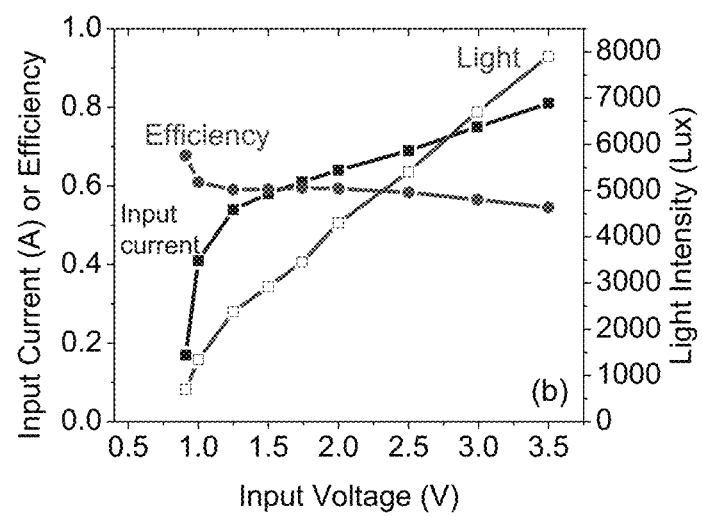
FIG. 4B depicts a graph illustrating operating curves of electronic components including an LED driver and an LED.
Figure 4C:
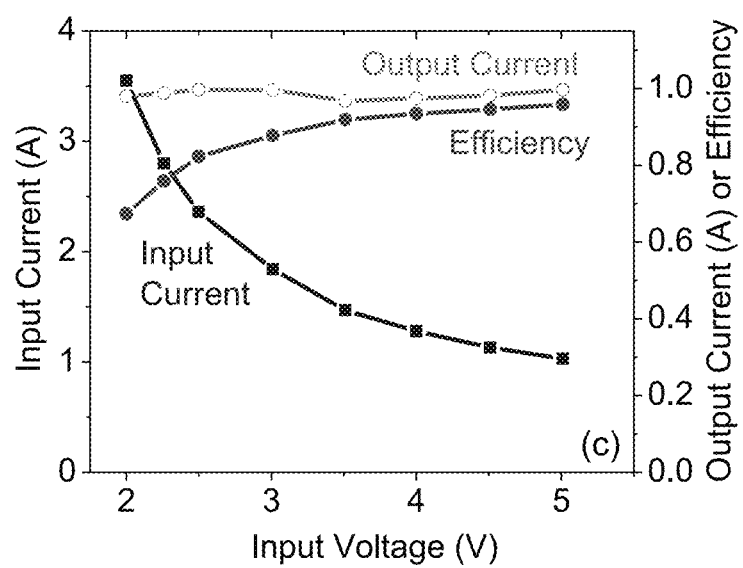
FIG. 4C illustrates a 5 V-output voltage boost converter with Forward voltage (black triangles), light intensity (open green squares), power consumption (magenta diamonds), efficiency (closed red circles), input current (closed blue squares), output current (open grey circles)

FIGS. 4A-4C depict graphs illustrating operating curves of electronic components. FIG. 4A depicts a graph illustrating the operating curve of an LED, FIG. 4B depicts a graph illustrating the operating curve of an LED driver and LED, and FIG. 4C depicts a graph illustrating the operating curve of a 5 V-output voltage boost converter. Forward voltage (black triangles), light intensity (open green squares), power consumption (magenta diamonds), efficiency (closed red circles), input current (closed blue squares), output current (open grey circles).

FIG. 4A illustrates the behavior of a white LED (Cree XPLAWT). The light output of the LED varies approximately linearly with current driven through the diode. The LED forward voltage ($V_f$) is roughly independent of current, varying from 2.6 to 2.8 V. Other acceptable LEDs include SSC-SZ5, STW8Q14C, and STW8T16C (Seoul Semiconductor). As shown in FIG. 4B, the driver (Micropuck 2009-SHO) can turn on the LED for voltages as low as 0.9 V, and 3.5V is tolerated without damaging the LED. The driver operates at moderate electrical efficiency; around 60% of the input energy is transferred to the LED and is available for lighting. Other acceptable LED drivers include: MCP1643 (Microchip Technology), MCP1640 (Microchip Technology), and NCP 5030 (ON Semiconductor). For context, reading with an LED close to the page requires about 200 lux, rich colors are visible at 1000 lux, and a large area such as a picnic table or small hut can be lit comfortably at 3500 lux. These scenarios correspond to power consumption of the combined LED and driver in the range 75 to 1200 mW. This is lower than the range of power expected for charging a mobile phone (1 W to 5 W) so a fuel cell stack sized for phone charging will easily provide enough power for bright, satisfying light.

The USB standard for charging mobile devices is 5V. That voltage may be provided by a voltage boost converter 18 that accepts input power over a wide range of input voltages as shown in FIG. 4C. When the output of the boost converter 18 is connected to a power source at lower than 5V (typically 4.2V to 4.8V), current flows. As an example, a Samsung Galaxy III smartphone draws a maximum of 1 A, but will accept charging at lower currents if high power is not available. The boost converter (Texas Instruments TPS61032) is capable of supplying 1 A at efficiency greater than 75% for input voltage above 2.25V. A minimum input voltage of 2V is required for the boost converter to function. Other acceptable boost converters include: MCP1640 (Microchip Technology), NCP1402 (ON Semiconductor), TPS61202 (Texas Instruments), TPS61032 (Texas Instruments), and X000U7S38F (Drok).

Mobile device charging requires more power than LED lighting, so in at least one embodiment the stack is sized according to the boost converter performance (See FIG. 4C). For typical SOFC applications such as grid power, fuel efficiency is critical and cells are operated well below their peak power. In contrast, fuel efficiency of the MS-SOFC is not a concern for this application, as the vast majority of fuel energy is used productively for cooking. It is desirable, however, to minimize the required area and therefore the cost of the cells, so it is optimal to operate at peak power.

For direct-flame MS-SOFCs, peak power is achieved at approximately 0.5 V (See FIG. 2A). For efficient phone charging, 2.5V is a reasonable minimum input voltage (See FIG. 4C), and this is compatible with the LED driver as well (See FIG. 4B). Therefore, a stack of five MS-SOFCs in series, delivering 2.5V (0.5V each) was chosen. At 2.5V, the boost converter requires 2.36 A input current to deliver approximately 1 A for smartphone charging. Assuming a peak power of 350 mW cm$^{-2}$ for the MS-SOFC in the non-optimized conditions of the cooking stove (about 55% the power achieved in the optimized conditions of FIG. 2A), the cells will provide 700 mA cm$^{-2}$ at 0.5V, and the desired 2.36 A input to the boost converter requires 3.4 cm$^2$ of active area per cell. In summary, a series connection of five 3.4 cm$^2$ cells was chosen as the nominal stack design and implemented in the fabrication of the product.

Figure 5A:
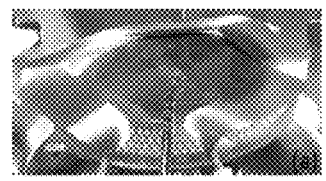
FIG. 5A depicts an image of a horizontal MS-SOFC stack of cells arranged around/on a burner.

In at least one embodiment a 5-cell stack is mounted on a camping stove, with the cells placed horizontally with respect to and above the hottest part of the burner or flame and distributed in a ring around the circumference of the circular burner (See FIG. 5A). Low and high flame settings both produced OCV of 4.1V (average of 0.82V per cell) and moderate mass transport limitation at higher current density, consistent with the single cell result in optimized conditions (See FIG. 2A). Note that SOFCs operating with pure hydrogen vs. air display OCV near 1.1V.

Figure 5B:
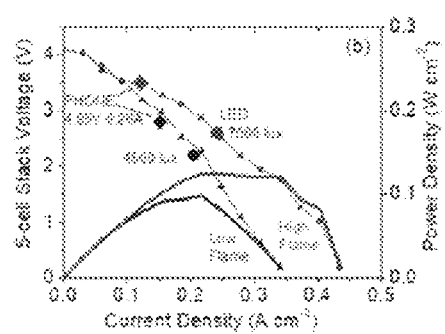
Figure 5C:
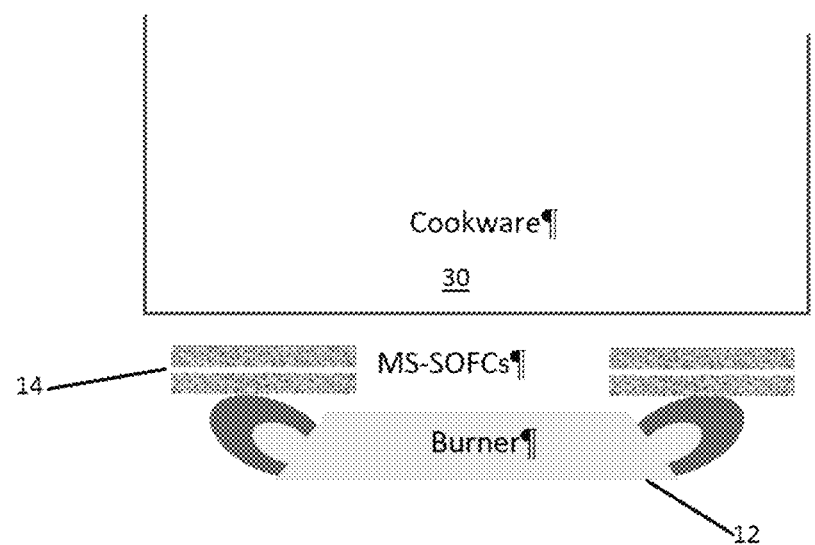
FIG. 5C depicts a schematic of the device with MS-SOFC cells above the burner in a horizontal position, with a cooking pot placed above the burner.

FIG. 5A-5C illustrate the demonstration of the system with cells arranged horizontally to the burner. FIG. 5A depicts an image of with five cell MS-SOFC stack on a burner. FIG. 5B illustrates such stack performance at high (red square) and low (blue triangle) camp stove flame settings. Large data points indicate the stack operation point when the LED (circles) or phone charging (diamonds) circuits were connected to the MS-SOFC stack. A Samsung Galaxy III was the smartphone being charged. FIG. 5C depicts a burner with the MS-SOFC cells 14 positioned above the burner 12 in a horizontal position with respect to the burner 12, with a cooking pot 30 positioned above the burner 12.

Lower concentration of electrochemically active fuel species ($H_2$ and CO) and higher oxygen partial pressure ($CO_2$, $H_2O$) are present in the flame. The equivalence ratio of the camping stove is expected to be greater than 1 (the stoichiometric limit for sufficient air mixed with the fuel as opposed to the actual case in which additional air diffuses to the visible secondary flame cone), and less than 2 (above which yellow tipped flame and soot deposition on cookware begins to be observed). In this range, previous thermodynamic calculations and experimental gas species analysis indicate approximate CO mole fraction of 0.05 to 0.2 and $H_2$ mole fraction of 0.05 to 0.12 in the inner flame cone are typical, the balance being primarily $H_2O$ and $CO_2$. Performance improves with higher flame setting, likely as a result of both higher cell temperature and higher fuel flow rate. At the high flame setting, peak power density is 124 mWcm$^{-2}$, corresponding to a total stack power of 2.1 W. The power density is significantly below that obtained for single cells under optimized conditions, and below that assumed for the nominal stack design discussed previously.

Improvement of the total power may be expected after optimizing placement of the cells with respect to the flames and tailoring the cell shape to better match the circular burner. In particular, the temperature and distance of the cell to the burner is highly non-uniform across each cell 14, as seen in FIG. 5A. Cold spots are visible as dark areas of the cells 14, and the inside edge of each cell 14 is almost touching the burner s12 whereas the outside edge is almost 2 cm from the inner flame cone. The concentration of all electrochemically-active species varies spatially within the flame, so optimal placement of the cell within the flame can be important for maximizing performance. Despite the relatively low power density, the total stack power is sufficient to produce bright LED lighting and charge a phone. FIG. 5A depicts the stack operating points when either phone charging or LED lighting circuits are connected to the stack. The LED produced 4500 to 7000 lux, which is more than bright enough to illuminate a campsite comfortably for reading, cooking, or conversation. The mobile device received 0.26 A charging current, which is high enough for a feature phone, but lower than desirable for a smartphone with a large battery. Note that the stack operation during phone charging occurs at significantly lower current density than the maximum power point. This suggests further effort to match the stack polarization curve and the phone charging circuitry would result in higher power available to the phone, for example by optimizing the number and size of the MS-SOFC cells.

Figure 6A:
FIG. 6A depicts an image of the MS-SOFC stack surrounding a burner in a vertical position.
Figure 6B:
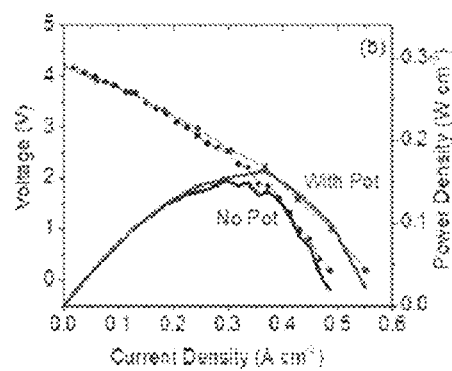
Figure 6C:
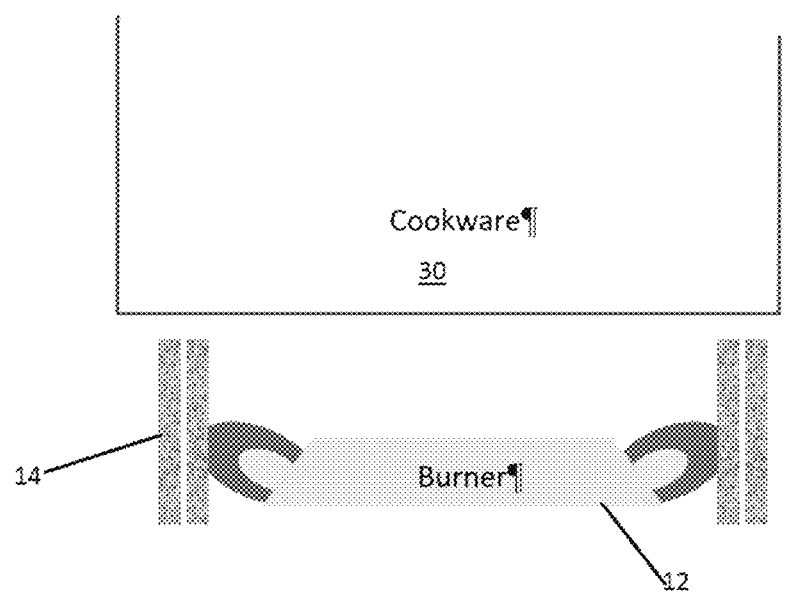
FIG. 6C depicts a schematic of a burner with MS-SOFC cells positioned around the burner in a vertical position, with a cooking pot placed above the burner.

FIG. 6A-6C depicts embodiments of the device with vertical cells arranged about a burner. FIG. 6A depicts an image of MS-SOFC stack surrounding burner. FIG. 6B depicts a graph illustrating stack performance with (red squares) and without (blue triangles) a water-filled pot on the stove. FIG. 6C depicts a burner 12 with MS-SOFC cells 14 positioned around the burner 12 in a vertical position with respect to the burner 12, with a cooking pot 30 placed above the burner 12.

When a cooking pot with water was placed on top of the camping stove, the OCV of the stack fell immediately to near 0 V and power could not be generated. It appeared that the pot was preventing fresh air from contacting the cathodes, and as a result partially or completely combusted fuel was present on both sides of the cell. Of course, it is desirable to be able to produce power and cook simultaneously. This issue was solved by redesigning the MS-SOFC stack so that the cells were mounted vertically, creating a wall between the flame and surrounding air (See FIG. 6A). With this arrangement, the cathode was continuously exposed to fresh air and similar polarization behavior was obtained in both the presence and absence of a pot on the stove. This stack design also produced somewhat higher total power than the horizontal design: 2.4 W with no pot, and 2.7 W with a pot (See FIG. 6B).

Figure 7A:
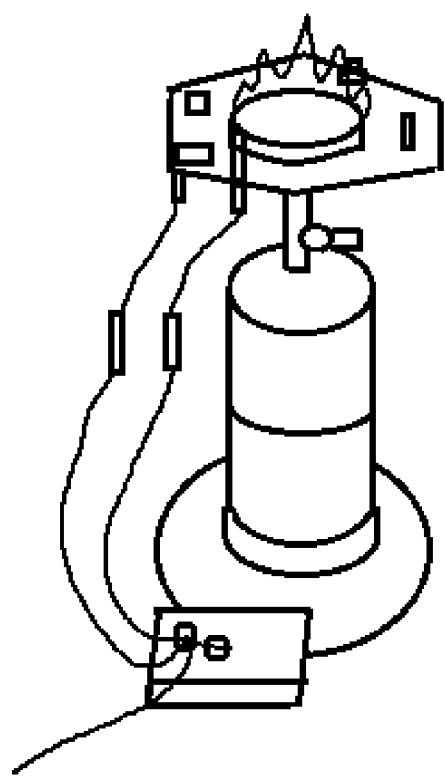
FIG. 7A depicts a complete stand-alone system operating outdoors at night and FIG. 7B depicts a complete stand-alone system operating outdoors at night and charging a smartphone as illustrated.
Figure 7B:
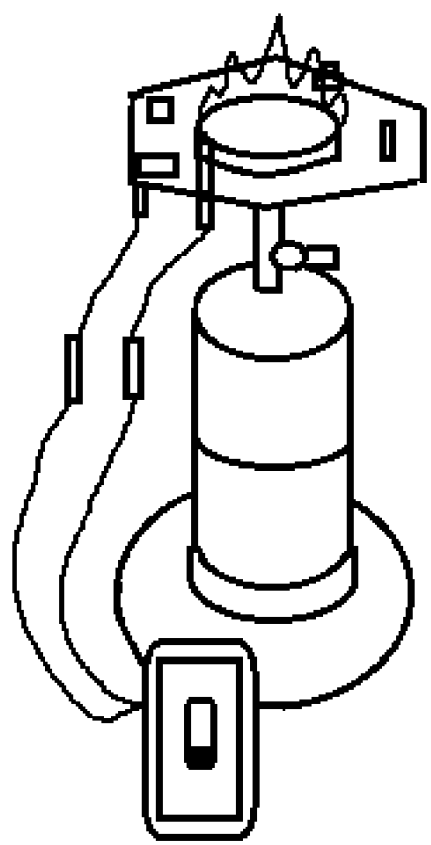

It is thought that the pot helps retain the hot combustion gases, and the stack is hotter and therefore produces more power with the pot in place. With the pot in place, the stack delivered 0.79 A at 2.6 V to the LED driver circuit, producing 6500 lux lighting, and 0.85 A at 1.9 V to the phone charging circuit. The impact of inserting the MS-SOFC stack in the flame on cooking efficiency was determined by heating water from room temperature to 95° C. in the pot, with and without the fuel cells in place. Propane consumption was monitored by weighing the stove before and after heating the water. With the MS-SOFC stack in place the water heating rate was 4.4° C. g-propane$^{-1}$, 94% of the baseline heating rate without fuel cells (4.7° C. g-propane$^{-1}$). This seems a small decrease in cooking efficiency when considered with respect to the additional functionality the MS-SOFC stack provides. The final design with vertical cells is shown in stand-alone operation outdoors, providing LED lighting and mobile phone charging, in FIG. 7A-7B.

Figure 8:
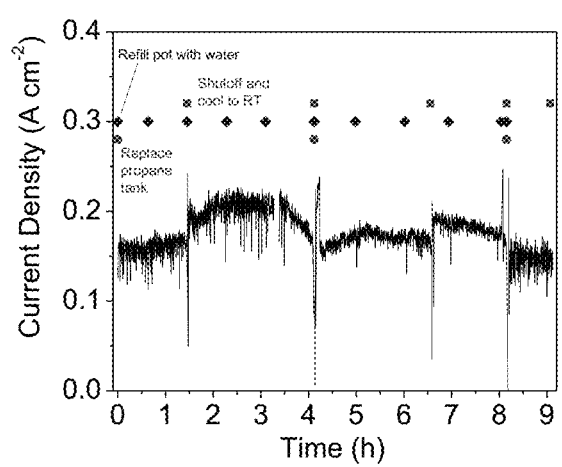
FIG. 8 depicts a graph illustrating an initial durability while boiling water.

FIG. 8 depicts a graph illustrating the initial durability while boiling water. Potentiostatic operation of MS-SOFC at 2.5 V (black line). Points indicate times at which the water was almost completely evaporated and the pot was refilled with water (blue diamonds), the system was shut off and cooled to room temperature (green squares), or the propane tank was empty and replaced (red circles).

Durability of the MS-SOFC stack was demonstrated for 9 hours while boiling water in a pot to represent camping cooking. FIG. 8 illustrates the current generated while operating the stack potentiostatically at 2.5 V. Every time the water was almost boiled away, the pot was removed, filled with water, and placed back on the stove. When the pot was removed the stack performance declined a small amount, consistent with FIG. 6. The stack survived 5 thermal cycles between room temperature and cooking temperature, when the flame was shut off to change to a new propane tank or between cooking sessions. The 465 g propane tanks lasted approximately 4 h, and the stack current varied somewhat over the lifetime of the tank, presumably due to variations in propane pressure or temperature; as the propane level dropped in the tank, the tank cooled leading to condensation and frost on the outside of the tank. Rapid fluctuations in the current were also observed and are thought to arise from unsteady air circulation around the stove. Note that the propane flow was controlled by the low-cost built-in stove valve, which is not expected to provide precise control; this may explain some of the variation in performance over the testing period. Regardless of these testing limitations, the MS-SOFC stack and camping stove successfully produced power while cooking for over 9 h, without significant degradation.

Figure 9A:
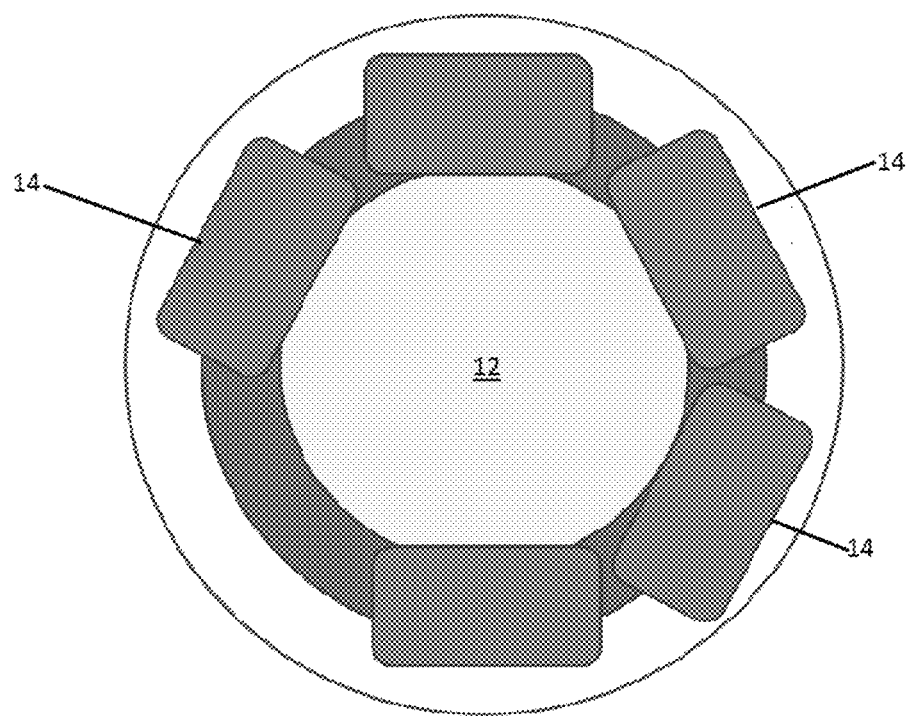
Figure 9B:
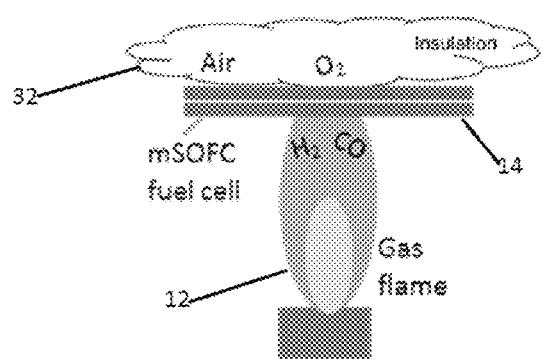
FIG. 9B depicts a single MS-SOFC positioned above a burner, with optional insulation on top of the MS-SOFC to increase the cell temperature.

FIG. 9A depicts an arrangement of 5 MS-SOFC cells 14 over the flame area of a burner 12. FIG. 9B depicts a single MS-SOFC 14 positioned above a burner 12, with insulation 32 in contact with one surface of one or more of the MS-SOFC 14 to increase the cell temperature.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A portable, personal device for providing cooking and power and adapted for use with a burner, the device comprising:
   a plurality of metal-supported solid oxide fuel cells (MS-SOFCs) coupled together;
   a microelectronic control circuit connected to the MS-SOFCs;
   a light source coupled to at least the microelectronic control circuit; and
   at least one USB port coupled to at least the microelectronic control circuit; whereby the device is able to provide light and power a personal mobile device.

2. The device of claim 1 wherein the MS-SOFCs are oriented vertically with respect to the burner.

3. The device of claim 1 wherein the MS-SOFCs are oriented horizontally with respect to the burner.

4. The device of claim 1 wherein the plurality of MS-SOFCs comprise a stack of 5 MS-SOFCs.

5. The device of claim 4 wherein the MS-SOFCs are connected in series.

6. The device of claim 5 wherein each one of the MS-SOFCs delivers 0.3V to 0.6V.

7. The device of claim 1 wherein the light source comprises an LED.

8. The device of claim 7 wherein the microelectronic circuit includes an LED driver in communication with the MS-SOFCs and the LED.

9. The device of claim 1 wherein the microelectronic circuit comprises a boost converter in communication with at least the MS-SOFCs and the USB port.

10. The device of claim 1 further including thermal insulation in contact with at least one surface of one of the MS-SOFCs.

11. A portable, personal device for providing cooking and power and adapted for use with a burner, the device comprising:
    a stack of five metal-supported solid oxide fuel cells (MS-SOFCs) coupled together;
    a microelectronic control circuit connected to the MS-SOFCs;
    an LED coupled to at least the microelectronic control circuit; and
    at least one USB port coupled to at least the microelectronic control circuit;
    whereby the device is able to provide light and power a personal mobile device.

12. The device of claim 11 wherein the MS-SOFCs are connected in series.

13. The device of claim 12 wherein each one of the MS-SOFCs delivers 0.3V to 0.6V.

14. A system for providing cooking and power, the system comprising:
    a burner;
    a stack of metal-supported solid oxide fuel cells (MS-SOFCs) coupled together and oriented vertically;
    a microelectronic control circuit connected to at least the MS-SOFCs;
    at least one LED lighting element coupled to at least the microelectronic control circuit; and
    at least one USB port, whereby the MS-SOFCs provide an order of magnitude higher power, whereby the device is able to simultaneously provide power, personal device charging and cooking.

15. The device of claim 14 wherein the MS-SOFCs are oriented perpendicular with respect to the burner.

16. The device of claim 14 wherein the MS-SOFCs are oriented horizontally with respect to the burner.

17. The device of claim 14 wherein the plurality of MS-SOFCs comprise a stack of 5 MS-SOFCs.

18. The device of claim 17 wherein the 5 stacked MS-SOFCs are connected in series.

19. The device of claim 18 wherein each one of the 5 stacked MS-SOFCs delivers 0.3 to 0.6 V.

20. The device of claim 14 wherein the microelectronic circuit comprises a boost converter in communication with at least the MS-SOFCs and the USB port.

* * * * *